(12) United States Patent
Harigai et al.

(10) Patent No.: US 9,942,447 B2
(45) Date of Patent: Apr. 10, 2018

(54) COLOR PROCESSING DEVICE FOR COMPOSITING COLOR CONVERSION RULES, IMAGE FORMING SYSTEM, COLOR PROCESSING METHOD, AND NON-TRANSITORY COMPUTER READABLE MEDIUM

(71) Applicant: FUJI XEROX CO., LTD., Tokyo (JP)

(72) Inventors: Jungo Harigai, Kanagawa (JP); Ryosuke Higashikata, Kanagawa (JP); Yoshitaka Kuwada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/255,216

(22) Filed: Sep. 2, 2016

(65) Prior Publication Data
US 2017/0257531 A1    Sep. 7, 2017

(30) Foreign Application Priority Data

Mar. 4, 2016 (JP) .................................. 2016-042547

(51) Int. Cl.
*H04N 1/60* (2006.01)

(52) U.S. Cl.
CPC ......... *H04N 1/6025* (2013.01); *H04N 1/6008* (2013.01)

(58) Field of Classification Search
None
See application file for complete search history.

(56) References Cited

U.S. PATENT DOCUMENTS 8,797,614 B2 * 8/2014 Yamaguchi .......... H04N 1/6019
                                                            358/521

FOREIGN PATENT DOCUMENTS

JP   2008-245024 A   10/2008
JP    2011-19030 A    1/2011

* cited by examiner

*Primary Examiner* — Barbara Reinier
(74) *Attorney, Agent, or Firm* — Sughrue Mion, PLLC

(57) ABSTRACT

A color processing device includes a compositing unit, a modification unit, and an output unit. The compositing unit composites plural color conversion rules in a color space that includes plural color components through serial processing. The modification unit modifies the color conversion rules after being composited by the compositing unit, by applying an inverse conversion of a specific one-dimensional correlation, which correlates input color values and output color values in the color space, to the composited color conversion rules. The output unit outputs the composited color conversion rules after being modified and the specific one-dimensional correlation.

8 Claims, 7 Drawing Sheets

COLOR PROCESSING DEVICE FOR COMPOSITING COLOR CONVERSION RULES, IMAGE FORMING SYSTEM, COLOR PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-042547 filed Mar. 4, 2016.

BACKGROUND

Technical Field

The present invention relates to a color processing device, an image forming system, a color processing method, and a non-transitory computer readable medium.

SUMMARY

According to an aspect of the present invention, there is provided a color processing device including: a compositing unit that composites plural color conversion rules in a color space that includes plural color components through serial processing; a modification unit that modifies the color conversion rules after being composited by the compositing unit, by applying an inverse conversion of a specific one-dimensional correlation, which correlates input color values and output color values in the color space, to the composited color conversion rules; and an output unit that outputs the composited color conversion rules after being modified and the specific one-dimensional correlation.

BRIEF DESCRIPTION OF THE DRAWINGS

Exemplary embodiments of the present invention will be described in detail based on the following figures, wherein.

DETAILED DESCRIPTION

Figure 1:
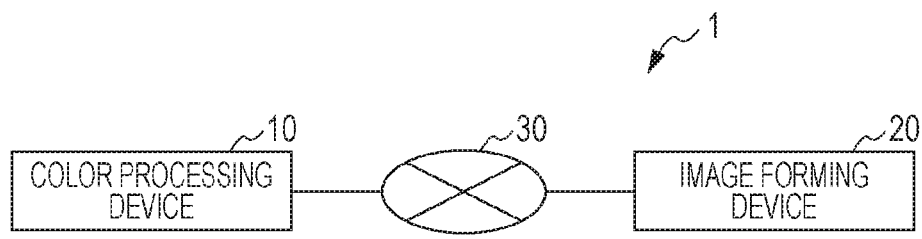
FIG. 1 illustrates an example of the configuration of a color processing system according to an exemplary embodiment of the present invention.

An exemplary embodiment of the present invention will be described in detail below with reference to the accompanying drawings.

Devices that output an image such as printers and printing machines perform various color conversion processes such as color matching, calibration, and color proofing. In such color conversion process, a one-dimensional look-up table (LUT) and a multi-dimensional LUT, for example, are generally used.

More specifically, in the case where an output is made using output colors of a device targeted by each device, for example, a color conversion profile process is performed. In the color conversion profile process, for example, a multi-dimensional LUT that converts the output colors of the device defined in a CMYK color space into the output colors of the targeted device defined in the CMYK color space is used.

In the case where the output colors of a device are modified to the standard state (or initial state) of the device, for example, a calibration process is performed. In the calibration process, for example, a multi-dimensional LUT that modifies the output colors of the device defined in the CMYK color space into the output colors in the standard state is used.

The multi-dimensional LUTs used in the color conversion profile and the calibration are intended to convert CMYK values defined in the CMYK color space (CMYK→C'M'Y'K'), for example. In this case, the color values of lattice points (CMYK) obtained by dividing the CMYK color space are correlated with the color values (C'M'Y'K') after the conversion. With such multi-dimensional LUTs, an interpolation process is performed for color values between a lattice point and a lattice point. Because linear interpolation is performed, however, the color is not reproduced perfectly.

As the countermeasures, a modification process in which tone values are modified using a tone reproduction curve (TRC) or the like, for example, is occasionally performed. The TRC is a curve that represents the tone reproducibility of a device, and represents the relationship between colors input to the device and colors output from the device. That is, the TRC is non-linear, and thus a tone modification performed using the TRC is a non-linear process. For example, the tone modification is performed by preparing in advance a one-dimensional LUT for the TRC in which the color values before a non-linear process and the color values after the non-linear process are correlated with each other, and performing a color conversion on the color values to be subjected to the tone modification using the one-dimensional LUT. Applying the one-dimensional LUT for the TRC in this way implements the tone modification to secure non-linearity. In the non-linear process performed using the TRC, a modification is performed such that data input to a multi-dimensional LUT for the TRC to be used in the next color conversion approximates a linear shape.

When a multi-dimensional LUT is generated as a result of compositing plural color conversion processes, linear interpolation is performed by the multi-dimensional LUT on color values each located between a lattice point and a lattice point. In such a case, it is considered that the color may not be reproduced perfectly as discussed above. Therefore, a procedure for considering a tone modification performed by a TRC in the case of compositing plural color conversion processes including a one-dimensional LUT such as a TRC will be described below.

<Overall Description of Color Processing System>

FIG. 1 illustrates an example of the configuration of a color processing system 1 according to an exemplary embodiment of the present invention.

The color processing system 1 includes a color processing device 10 and an image forming device 20 connected by a network 30.

As discussed in detail later, the color processing device 10 composites plural LUTs used by the image forming device 20 to perform a color conversion profile process or calibration process. The plural LUTs are an example of the "color conversion rules", and are intended to perform a color conversion process in a color space (e.g. a CMYK color space) that includes plural color components.

The image forming device 20 is a printer that forms an image using an electrophotographic system or an inkjet system, for example, and has a function of forming an image on the basis of color components (e.g. CMYK) determined in advance. The image forming device 20 forms an image by receiving LUTs from the color processing device 10 via the network 30 and performing a color conversion profile process or calibration process on the basis of the received LUTs.

The network 30 is a communication unit used for information communication between the color processing device 10 and the image forming device 20, and may be a local area network (LAN), for example.

First Exemplary Embodiment

<Functional Configuration of Color Processing Device>

Figure 2:
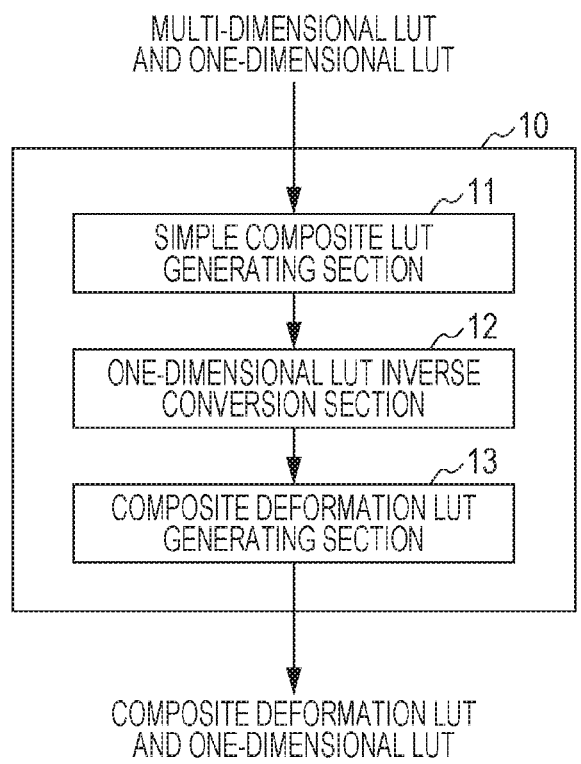
FIG. 2 is a block diagram illustrating an example of the functional configuration of a color processing device according to a first exemplary embodiment.

First, a first exemplary embodiment will be described. FIG. 2 is a block diagram illustrating an example of the functional configuration of the color processing device 10 according to the first exemplary embodiment. The color processing device 10 according to the exemplary embodiment includes a simple composite LUT generating section 11, a one-dimensional LUT inverse conversion section 12, and a composite deformation LUT generating section 13.

The simple composite LUT generating section 11, which is an example of the "compositing unit", acquires a multi-dimensional LUT and a one-dimensional LUT, which are to be composited, from an LUT storage section (not illustrated) that stores LUTs to be used in various color conversion processes, the image forming device 20, or the like. The multi-dimensional LUT and the one-dimensional LUT are intended to perform a color conversion process in a color space (e.g. a CMYK color space) that includes plural color components. The simple composite LUT generating section 11 composites the acquired multi-dimensional LUT and one-dimensional LUT through serial processing. In the following description, an LUT generated through the composition performed by the simple composite LUT generating section 11 will be referred to as a "simple composite LUT".

For further description, the simple composite LUT generating section 11 acquires a first multi-dimensional LUT, a one-dimensional LUT, and a second multi-dimensional LUT as the LUTs to be composited. Such LUTs are applied in the color conversion process in the order of the first multi-dimensional LUT, the one-dimensional LUT, and the second multi-dimensional LUT. In other words, the one-dimensional LUT is used in a color conversion process positioned between a color conversion process performed by the first multi-dimensional LUT and a color conversion process performed by the second multi-dimensional LUT. The color conversion processes performed by the first multi-dimensional LUT, the one-dimensional LUT, and the second multi-dimensional LUT are converted into a color conversion process performed by the simple composite LUT by the compositing process performed by the simple composite LUT generating section 11.

The first multi-dimensional LUT is a multi-dimensional LUT used in the color conversion profile process, for example. The first multi-dimensional LUT is used to convert CMYK values defined in the CMYK color space (CMYK→C'M'Y'K'), for example. The one-dimensional LUT is a TRC, for example, and is intended to secure non-linearity with respect to the colors output from the first multi-dimensional LUT and modifies the tone values. The one-dimensional LUT is present for each color component in the CMYK color space, for example, and used to convert CMYK values for each color component (C→C', M→M', Y→Y', and K→K'), for example. The second multi-dimensional LUT is a multi-dimensional LUT used in the calibration process, for example. As with the first multi-dimensional LUT, the second multi-dimensional LUT is used to convert CMYK values defined in the CMYK color space (CMYK→C'M'Y'K'), for example.

In the exemplary embodiment, the first multi-dimensional LUT and the second multi-dimensional LUT are used as an example of the "plural multi-dimensional color conversion rules". The one-dimensional LUT is used as an example of the "specific one-dimensional correlation".

The one-dimensional LUT inverse conversion section 12 generates a one-dimensional LUT (hereinafter referred to as an "inverse conversion LUT") which is an inverse conversion of the one-dimensional LUT (that is, the one-dimensional LUT before being composited by the simple composite LUT generating section 11). The one-dimensional LUT inverse conversion section 12 takes the one-dimensional LUT located between the first multi-dimensional LUT and the second multi-dimensional LUT to the outside, and disposes a set of the inverse conversion LUT and the one-dimensional LUT after the simple composite LUT. That is, the one-dimensional LUT inverse conversion section 12 performs a color conversion process using the inverse conversion LUT and the one-dimensional LUT after the color conversion process performed using the simple composite LUT. The one-dimensional LUT inverse conversion section 12 converts the color conversion process performed using the simple composite LUT into color conversion processes performed using the simple composite LUT, the inverse conversion LUT, and the one-dimensional LUT.

The composite deformation LUT generating section 13, which is an example of the "modification unit" and the "output unit", applies the inverse conversion LUT to the color conversion process performed using the simple composite LUT. In other words, the composite deformation LUT generating section 13 composites the simple composite LUT and the inverse conversion LUT through serial processing. The compositing process here is similar to the compositing process performed by the simple composite LUT generating section 11. In the following description, the LUT generated through the composition performed by the composite deformation LUT generating section 13 will be referred to as a "composite deformation LUT". That is, the composite deformation LUT generating section 13 converts the color conversion processes applied in the order of the simple composite LUT, the inverse conversion LUT, and the one-dimensional LUT into color conversion processes performed using the composite deformation LUT and the one-dimensional LUT. In the exemplary embodiment, the composite deformation LUT is used as an example of the "composited color conversion rules after being modified".

The composite deformation LUT generating section 13 outputs the composite deformation LUT and the one-dimensional LUT as a result of compositing the first multi-dimensional LUT, the one-dimensional LUT, and the second multi-dimensional LUT. In other words, the composite deformation LUT generating section 13 outputs the composite deformation LUT and the one-dimensional LUT in place of the first multi-dimensional LUT, the one-dimensional LUT, and the second multi-dimensional LUT to be composited. The composite deformation LUT and the one-dimensional LUT which have been output are transmitted to the image forming device 20.

<Process Performed by Color Processing Device>

Figure 3:
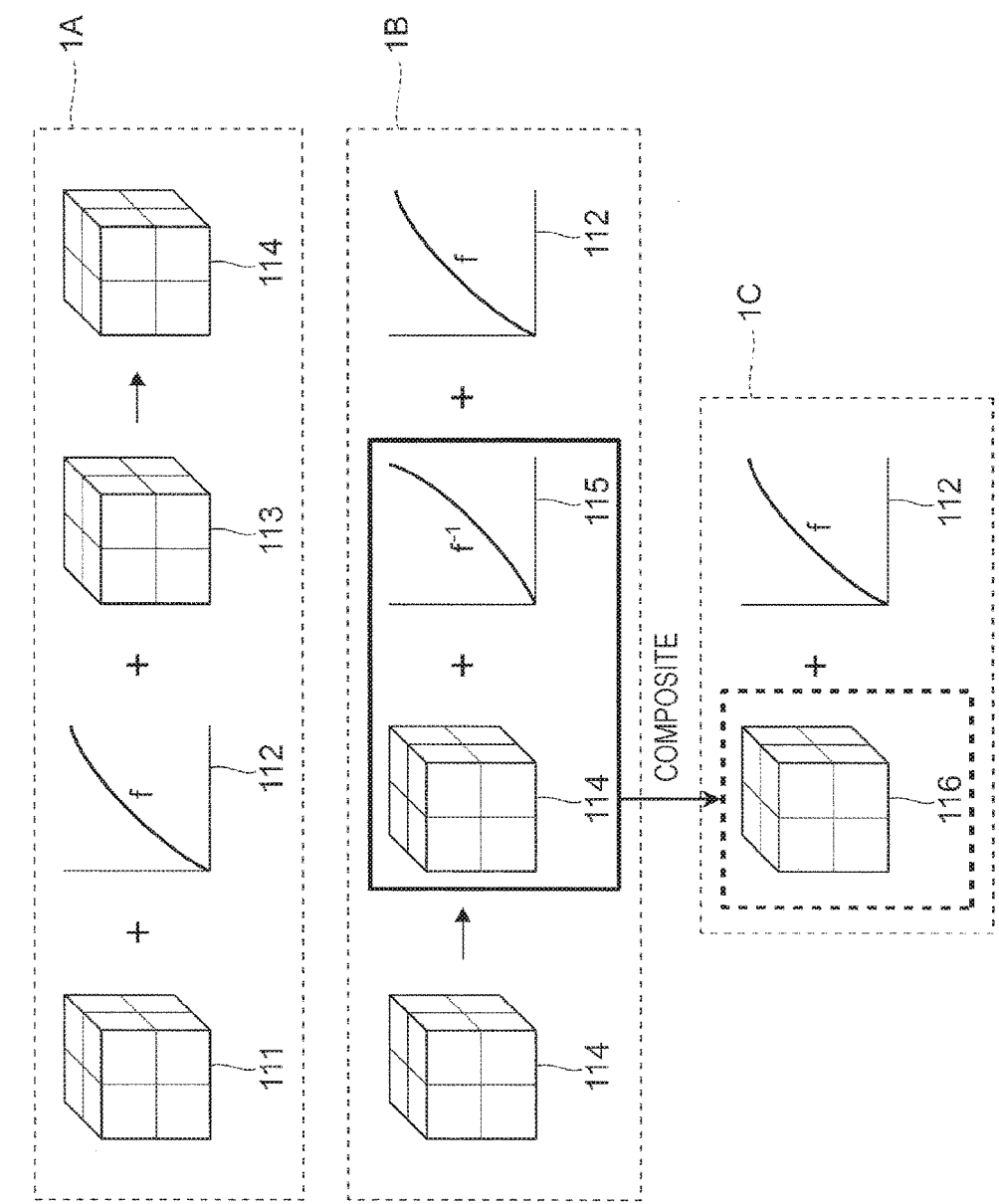
FIG. 3 illustrates an example of a process performed by the color processing device according to the first exemplary embodiment.

Next, a process performed by the color processing device 10 according to the first exemplary embodiment will be described in detail with reference to FIG. 3. FIG. 3 illustrates an example of the process performed by the color processing device 10 according to the first exemplary embodiment. In the example illustrated in FIG. 3, a multi-dimensional LUT 111, a one-dimensional LUT 112, and a multi-dimensional LUT 113 are the LUTs to be composited. Such LUTs are applied in the color conversion process before the composition in the order of the multi-dimensional LUT 111, the one-dimensional LUT 112, and the multi-dimensional LUT 113. In the description here, it is assumed that a color conversion process in the CMYK color space is performed.

In the exemplary embodiment, first, a process indicated by symbol 1A is executed.

In the process indicated by symbol 1A, the simple composite LUT generating section 11 acquires the multi-dimensional LUT 111, the one-dimensional LUT 112 (a "function f" illustrated in FIG. 3), and the multi-dimensional LUT 113. The simple composite LUT generating section 11 composites the acquired LUTs through serial processing to generate a simple composite LUT 114. At this stage, the color conversion processes performed using the multi-dimensional LUT 111, the one-dimensional LUT 112, and the multi-dimensional LUT 113 are converted into a color conversion process performed using the simple composite LUT 114.

More specifically, in generating the simple composite LUT 114, the simple composite LUT generating section 11 determines the color values (C value, M value, Y value, and K value) in the CMYK color space corresponding to each lattice point input to the simple composite LUT 114 as the color values input to the multi-dimensional LUT 111. For example, in the case where the simple composite LUT 114 is a multi-dimensional LUT with nine lattice points in the CMYK color space, the simple composite LUT 114 selects nine color values, among color values 0 to 255, as the color values of the lattice points (in this case, the number of the lattice points is the fourth power of 9=6561). By inputting the color values of the lattice points to the multi-dimensional LUT 111 as the input color values, the output color values in the CMYK color space are output. Next, the simple composite LUT generating section 11 determines the output color values in the CMYK color space output from the multi-dimensional LUT 111 as the input color values for the one-dimensional LUT 112. That is, the output color values (C value, M value, Y value, and K value) from the multi-dimensional LUT 111 are input to the one-dimensional LUT 112 corresponding to each color component (CMYK). The output color values are output from the one-dimensional LUT 112 for each color component. Next, the simple composite LUT generating section 11 determines the output color values in the CMYK color space output from the one-dimensional LUT 112 for each color component as the input color values for the multi-dimensional LUT 113. The output color values in the CMYK color space are output from the multi-dimensional LUT 113.

Through such serial processing, output color values are output from the multi-dimensional LUT 113 for color values corresponding to each lattice point input to the simple composite LUT 114. The simple composite LUT generating section 11 generates the simple composite LUT 114 by constituting, as an LUT, the correlation between the color values of the lattice points input to the simple composite LUT 114 and the output color values from the multi-dimensional LUT 113.

Next, in the exemplary embodiment, a process indicated by symbol 1B is executed.

In the process indicated by symbol 1B, the one-dimensional LUT 112 has been taken to the outside, and the one-dimensional LUT inverse conversion section 12 generates an inverse conversion LUT 115 (a "function $f^{-1}$" illustrated in FIG. 3) which is an inverse conversion of the one-dimensional LUT 112. Here, the inverse conversion LUT 115 corresponding to each color component (CMYK) is generated for the one-dimensional LUT 112 corresponding to each color component (CMYK). The one-dimensional LUT inverse conversion section 12 disposes a set of the inverse conversion LUT 115 and the one-dimensional LUT 112 after the simple composite LUT 114. At this stage, the color conversion process performed using the simple composite LUT 114 is converted into color conversion processes performed using the simple composite LUT 114, the inverse conversion LUT 115, and the one-dimensional LUT 112.

Next, in the exemplary embodiment, a process indicated by symbol 1C is executed.

In the process indicated by symbol 1C, the composite deformation LUT generating section 13 composites the simple composite LUT 114 and the inverse conversion LUT 115 to generate a composite deformation LUT 116. At this stage, the color conversion processes performed using the simple composite LUT 114, the inverse conversion LUT 115, and the one-dimensional LUT 112 are converted into color conversion processes performed using the composite deformation LUT 116 and the one-dimensional LUT 112.

Through the compositing process described above, the color conversion processes to be composited, that is, the color conversion processes performed using the multi-dimensional LUT 111, the one-dimensional LUT 112, and the multi-dimensional LUT 113, are finally converted into color conversion processes performed using the composite deformation LUT 116 and the one-dimensional LUT 112. That is, in the color conversion process before the LUT composition, there are two color conversion processes performed using multi-dimensional LUTs (the multi-dimensional LUT 111 and the multi-dimensional LUT 113). In contrast, in the color conversion process after the LUT composition, the number of color conversion processes performed using multi-dimensional LUTs has been reduced to one (the composite deformation LUT 116).

Here, the number of color conversion processes performed by multi-dimensional LUTs is reduced from two to one also in the case where the color conversion processes performed by the multi-dimensional LUT 111, the one-dimensional LUT 112, and the multi-dimensional LUT 113 are converted into a color conversion process performed by the simple composite LUT 114 through serial processing.

<Another Example of Process Performed by Color Processing Device>

Figure 4:
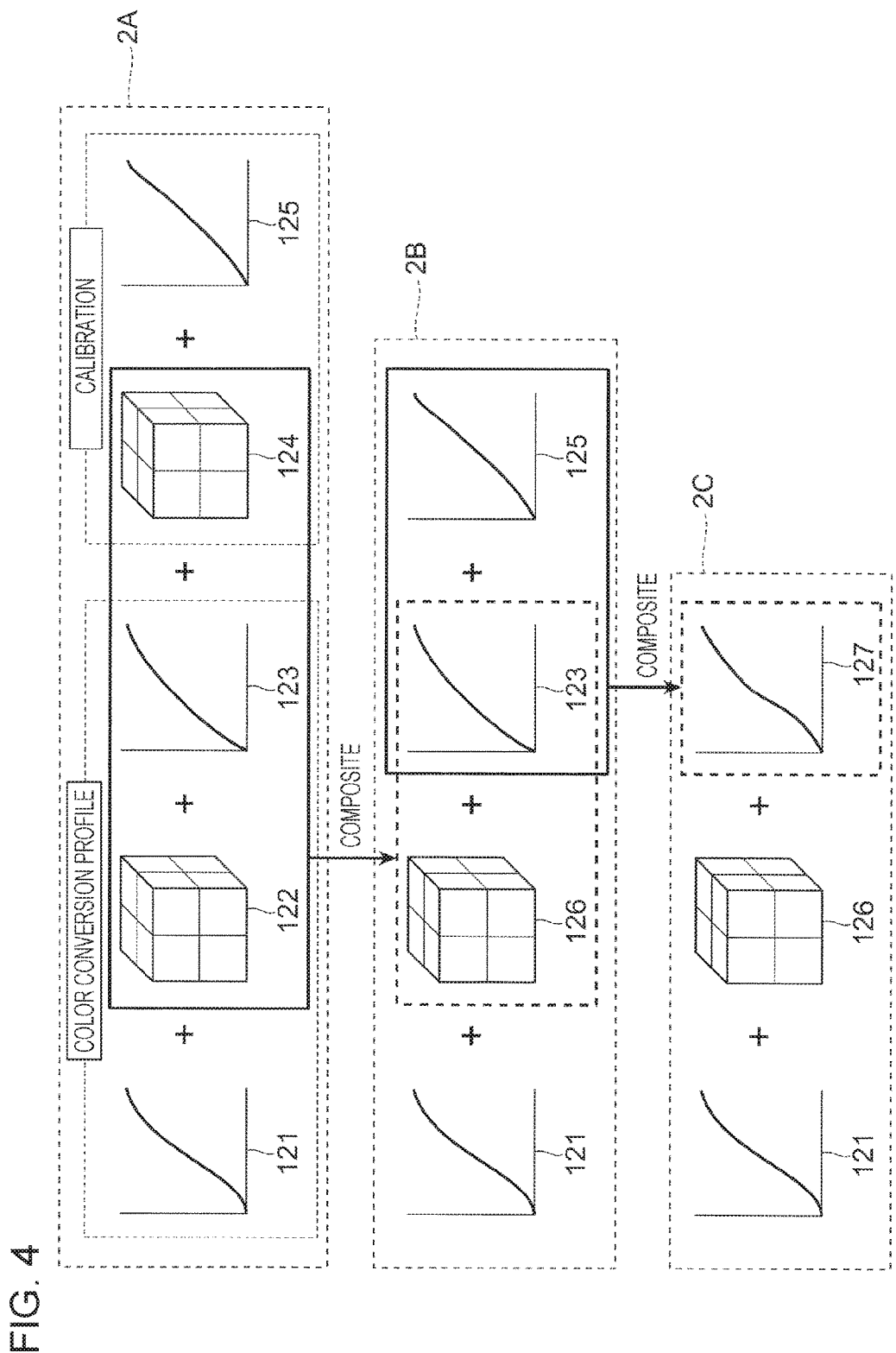
FIG. 4 illustrates another example of the process performed by the color processing device according to the first exemplary embodiment.

Next, another example of the process performed by the color processing device 10 according to the first exemplary embodiment will be described. FIG. 4 illustrates another example of the process performed by the color processing device 10 according to the first exemplary embodiment. In the example illustrated in FIG. 4, a calibration process is performed after a color conversion profile process. More specifically, the process indicated by symbol 2A indicates the color conversion profile process and the calibration process before the LUT composition. In the color conversion profile process, a one-dimensional LUT 121, a multi-dimensional LUT 122, and a one-dimensional LUT 123 are applied. In the calibration process, a multi-dimensional LUT 124 and a one-dimensional LUT 125 are applied.

The one-dimensional LUT 121, the one-dimensional LUT 123, and the one-dimensional LUT 125 are each a TRC, for example, and implement a tone modification. Additionally, the one-dimensional LUT 121 is intended to perform a tone modification prior to the color conversion profile process. The one-dimensional LUT 123 is intended to perform a tone modification posterior to the color conversion profile process and prior to the calibration process. The one-dimensional LUT 125 is intended to perform a tone modification posterior to the calibration process.

In the exemplary embodiment, first, a process indicated by symbol 2B is executed.

In the process indicated by symbol 2B, the multi-dimensional LUT 122, the one-dimensional LUT 123, and the multi-dimensional LUT 124 indicated by symbol 2A are to be composited. Through the processes performed by the simple composite LUT generating section 11, the one-dimensional LUT inverse conversion section 12, and the composite deformation LUT generating section 13, the color conversion processes performed using the multi-dimensional LUT 122, the one-dimensional LUT 123, and the multi-dimensional LUT 124 are converted into color conversion processes performed using a composite deformation LUT 126 and the one-dimensional LUT 123.

Next, in the exemplary embodiment, a process indicated by symbol 2C is executed.

In the process indicated by symbol 2C, the one-dimensional LUT 123 and the one-dimensional LUT 125 indicated by symbol 2B are to be composited. The simple composite LUT generating section 11 composites the one-dimensional LUT 123 and the one-dimensional LUT 125 to generate a new one-dimensional LUT 127. In the exemplary embodiment, plural one-dimensional LUTs to be applied consecutively may be composited.

Through the compositing process described above, the color conversion profile process and the calibration process are finally converted into the color conversion processes performed using the one-dimensional LUT 121, the composite deformation LUT 126, and the one-dimensional LUT 127. As a result, the number of color conversion processes performed using multi-dimensional LUTs is reduced from two to one.

In the example discussed above, in which the number of color conversion processes performed using multi-dimensional LUTs is reduced from two to one by compositing LUTs, a similar composition may be repeatedly performed. Repeatedly executing the compositing process reduces the number of color conversion processes performed using multi-dimensional LUTs in accordance with the number of repetitions.

Second Exemplary Embodiment

Next, a second exemplary embodiment will be described.

In the first exemplary embodiment, the color processing device 10 performs an inverse conversion on and composites the one-dimensional LUT interposed between the color conversion processes performed using the multi-dimensional LUTs to secure the non-linearity of the color components of the one-dimensional LUT. In contrast, in the second exemplary embodiment, the color processing device 10 generates a one-dimensional LUT for a specific color region determined in advance, and performs an inverse conversion on and composes the generated one-dimensional LUT to secure the non-linearity for the specific color region. In the second exemplary embodiment, components that are similar to those of the first exemplary embodiment are denoted by the same reference numerals to omit detailed description thereof.

Figure 5:
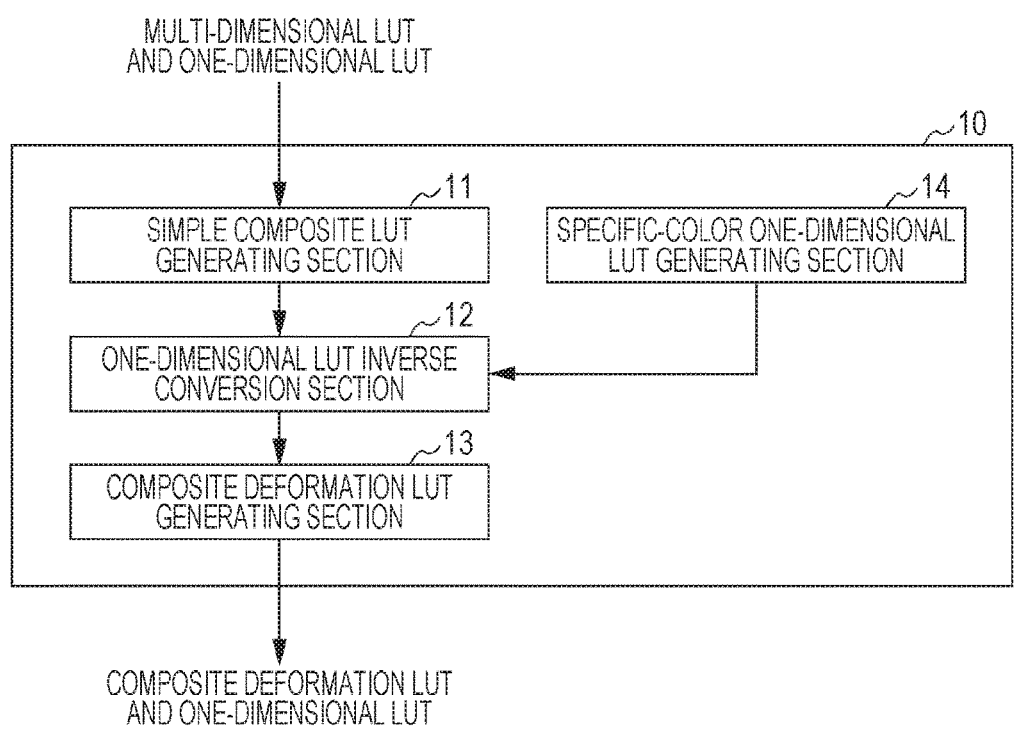
FIG. 5 is a block diagram illustrating an example of the functional configuration of a color processing device according to a second exemplary embodiment.

FIG. 5 is a block diagram illustrating an example of the functional configuration of the color processing device 10 according to the second exemplary embodiment. The color processing device 10 according to the exemplary embodiment includes a simple composite LUT generating section 11, a one-dimensional LUT inverse conversion section 12, a composite deformation LUT generating section 13, and a specific-color one-dimensional LUT generating section 14.

The specific-color one-dimensional LUT generating section 14 generates a one-dimensional LUT (hereinafter referred to as a "specific-color one-dimensional LUT") for a color (hereinafter referred to as a "specific color") in a specific color region.

More specifically, the specific-color one-dimensional LUT generating section 14 focuses on a specific color such as gray, for example. The specific-color one-dimensional LUT generating section 14 generates data (hereinafter referred to as "specific-color data") that indicate a tone in the specific color. In the case where the specific color is gray, the specific-color one-dimensional LUT generating section 14 generates, as the specific-color data, data on process black that contains equal amounts of color components of CMY and data on single-color black (K), for example.

Next, the specific-color one-dimensional LUT generating section 14 generates a specific-color one-dimensional LUT by performing serial processing in the same manner as the simple composite LUT generating section 11 generates a simple composite LUT. That is, the specific-color one-dimensional LUT generating section 14 determines the color values of the generated specific-color data as the input color values for the LUTs to be composited. Then, output color values to be finally output from the LUTs to be composited are obtained. The specific-color one-dimensional LUT generating section 14 generates a specific-color one-dimensional LUT by constituting, as an LUT, the correlation between the color values of the specific-color data, which are determined as the input color values, and the output color values finally output from the LUTs to be composited. In the case where the specific color is gray, a specific-color one-dimensional LUT for process black and a specific-color one-dimensional LUT for single-color black (K) are generated. In the exemplary embodiment, the specific-color one-dimensional LUT is used as an example of the "specific one-dimensional correlation".

When a specific-color one-dimensional LUT is generated by the specific-color one-dimensional LUT generating section 14, the one-dimensional LUT inverse conversion section 12 generates an inverse conversion LUT which is an inverse conversion of the generated specific-color one-dimensional LUT. The inverse conversion LUT and the simple composite LUT are composited to generate a composite deformation LUT. In the case where the specific color is gray, for example, an inverse conversion LUT for process black and an inverse conversion LUT for single-color black (K) are generated, and the inverse conversion LUTs are applied to the simple composite LUT to generate a composite deformation LUT.

Figure 6:
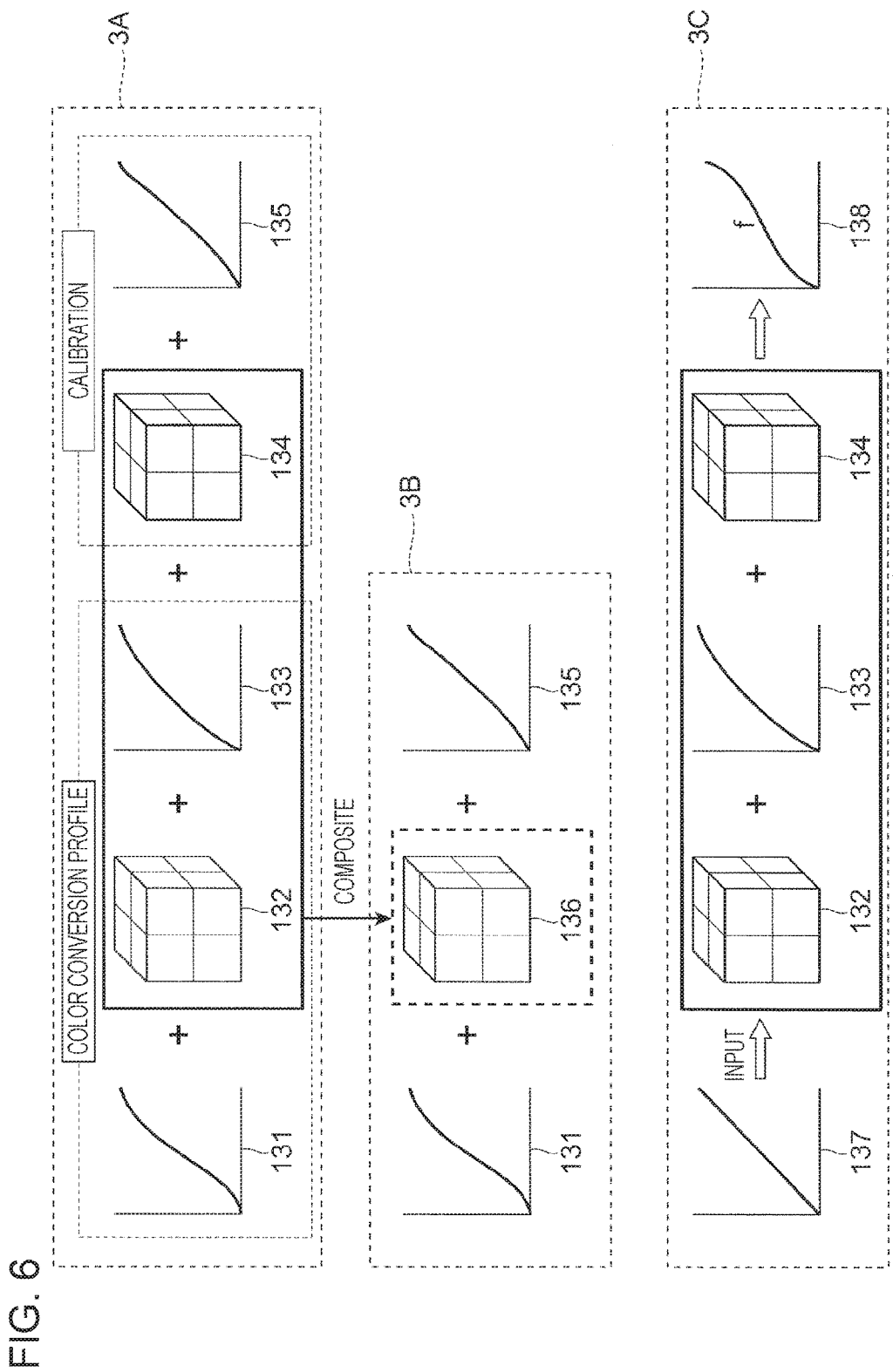
FIG. 6 illustrates an example of a process performed by the color processing device according to the second exemplary embodiment.
Figure 7:
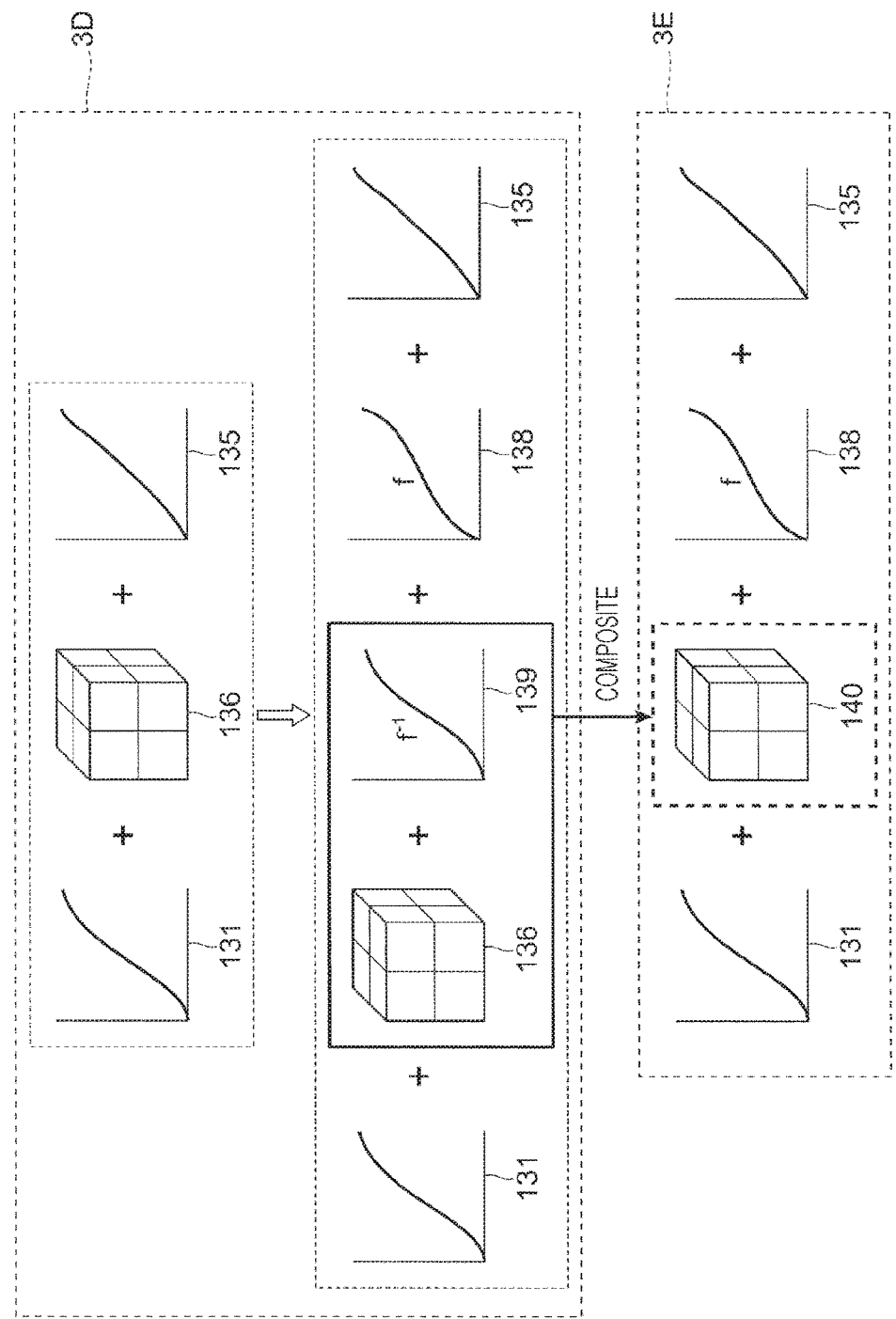
FIG. 7 illustrates an example of the process performed by the color processing device according to the second exemplary embodiment.

Next, a process performed by the color processing device 10 according to the second exemplary embodiment will be described with reference to FIGS. 6 and 7. FIGS. 6 and 7 illustrate an example of the process performed by the color processing device 10 according to the second exemplary embodiment. In the example illustrated in FIGS. 6 and 7, as in the example illustrated in FIG. 4, a calibration process is performed after a color conversion profile process. It is assumed that the specific color is gray.

The process indicated by symbol 3A indicates the color conversion profile process and the calibration process before the LUT composition. In the color conversion profile process, a one-dimensional LUT 131, a multi-dimensional LUT 132, and a one-dimensional LUT 133 are applied. In the calibration process, a multi-dimensional LUT 134 and a one-dimensional LUT 135 are applied.

The one-dimensional LUT 131, the one-dimensional LUT 133, and the one-dimensional LUT 135 are each a TRC, for example, and implement a tone modification. Additionally, the one-dimensional LUT 131 is intended to perform a tone modification prior to the color conversion profile process. The one-dimensional LUT 133 is intended to perform a tone modification posterior to the color conversion profile process and prior to the calibration process. The one-dimensional LUT 135 is intended to perform a tone modification posterior to the calibration process.

In the exemplary embodiment, first, a process indicated by symbol 3B is executed.

In the process indicated by symbol 3B, the multi-dimensional LUT 132, the one-dimensional LUT 133, and the multi-dimensional LUT 134 indicated by symbol 3A are to be composited. The simple composite LUT generating section 11 composites the LUTs through serial processing to generate a simple composite LUT 136.

Next, in the exemplary embodiment, a process indicated by symbol 3C is executed.

In the process indicated by symbol 3C, the specific-color one-dimensional LUT generating section 14 performs serial processing on the multi-dimensional LUT 132, the one-dimensional LUT 133, and the multi-dimensional LUT 134 indicated by symbol 3A to generate a specific-color one-dimensional LUT for the specific color (gray). Specifically, the specific-color one-dimensional LUT generating section 14 determines the color values of specific-color data 137 for process black and single-color black (K) as the input color values for the multi-dimensional LUT 132. Next, the output color values output from the multi-dimensional LUT 132 are determined as the input color values for the one-dimensional LUT 133. Next, the output color values output from the one-dimensional LUT 133 are determined as the input color values for the multi-dimensional LUT 134. Then, output color values to be output from the multi-dimensional LUT 134 are obtained. The specific-color one-dimensional LUT generating section 14 determines the correlation between the color values of the specific-color data 137, which are determined as the input color values, and the output color values output from the multi-dimensional LUT 134 as a specific-color one-dimensional LUT 138 (a "function f" illustrated in FIG. 6). Here, a one-dimensional LUT for process black and a one-dimensional LUT for single-color black (K) are generated as the specific-color one-dimensional LUT 138.

Next, in the exemplary embodiment, a process indicated by symbol 3D is executed.

In the process indicated by symbol 3D, the one-dimensional LUT inverse conversion section 12 generates an inverse conversion LUT 139 (a "function $f^{-1}$" illustrated in FIG. 7) which is an inverse conversion of the specific-color one-dimensional LUT 138 generated by the specific-color one-dimensional LUT generating section 14. The one-dimensional LUT inverse conversion section 12 disposes a set of the inverse conversion LUT 139 and the specific-color one-dimensional LUT 138 after the simple composite LUT 136. That is, the one-dimensional LUT inverse conversion section 12 performs a color conversion process using the inverse conversion LUT 139 and the specific-color one-dimensional LUT 138 after the color conversion process performed using the simple composite LUT 136.

Next, in the exemplary embodiment, a process indicated by symbol 3E is executed.

In the process indicated by symbol 3E, the composite deformation LUT generating section 13 composites the simple composite LUT 136 and the inverse conversion LUT 139 to generate a composite deformation LUT 140.

Through the compositing process described above, the color conversion profile process and the calibration process are finally converted into the color conversion processes performed using the one-dimensional LUT 131, the composite deformation LUT 140, the specific-color one-dimensional LUT 138, and the one-dimensional LUT 135. As a result, the number of color conversion processes performed using multi-dimensional LUTs is reduced from two to one.

In the example illustrated in FIGS. 6 and 7, the specific-color one-dimensional LUT generating section 14 selects the multi-dimensional LUT 132 as the first LUT when generating the specific-color one-dimensional LUT 138. However, the specific-color one-dimensional LUT generating section 14 may select an LUT prior thereto, or the one-dimensional LUT 131, for example, as the first LUT. In the case where the one-dimensional LUT 131 is selected as the first LUT, for example, a tone modification for the specific color in the entire process related to the color conversion process is implemented.

In this way, the color processing device 10 according to the exemplary embodiment generates a specific-color one-dimensional LUT for a specific color region determined in advance, and composites LUTs using an inverse conversion LUT obtained by performing an inverse conversion on the generated specific-color one-dimensional LUT. The compositing process reduces the number of color conversion processes performed by multi-dimensional LUTs.

In the example discussed above, in which the number of color conversion processes performed using multi-dimensional LUTs is reduced from two to one by compositing LUTs, a compositing process may be repeatedly executed as in the first exemplary embodiment. Repeatedly executing the compositing process reduces the number of color conversion processes performed using multi-dimensional LUTs in accordance with the number of repetitions.

The specific color region determined in advance is not limited to a gray tone, and may be a single-color tone of one color of CMYK, for example. The specific color region determined in advance may also be a tone for a certain color specified from image information or a tone in an image designated by a user.

In the exemplary embodiment, further, the color processing device 10 may generate, as a specific-color one-dimensional LUT, a one-dimensional LUT with the color gamut of the entire color space taken into consideration. In this case, the specific-color one-dimensional LUT generating section 14 inputs data on all the lattice points (e.g. color values 0 to 255 with 256 tones) in the CMYK color space, for example, to LUTs to be composited (in the example illustrated in FIGS. 6 and 7, the multi-dimensional LUT 132, the one-dimensional LUT 133, and the multi-dimensional LUT 134) as the input color values. When output color values to be finally output are obtained, the specific-color one-dimensional LUT generating section 14 constitutes, as an LUT, the correlation between data on all the lattice points, which are determined as the input color values, and the output color values output finally, and generates a specific-color one-dimensional LUT for each color component. By performing a compositing process using the specific-color one-dimensional LUT, a non-linear process with the color gamut of the entire color space taken into consideration is performed to implement a tone modification.

In the first exemplary embodiment and the second exemplary embodiment, LUTs to be used in the color conversion profile process and the calibration process are composited. However, the LUTs to be composited are not limited to the LUTs to be used in the color conversion profile process and the calibration process.

Further, the color conversion processes to be composited are not limited to color conversion processes performed using LUTs. For example, any processes that output color values when color values are input, such as color conversion matrices and color conversion model formulas, may be used.

<Example of Hardware Configuration of Color Processing Device>

Figure 8:
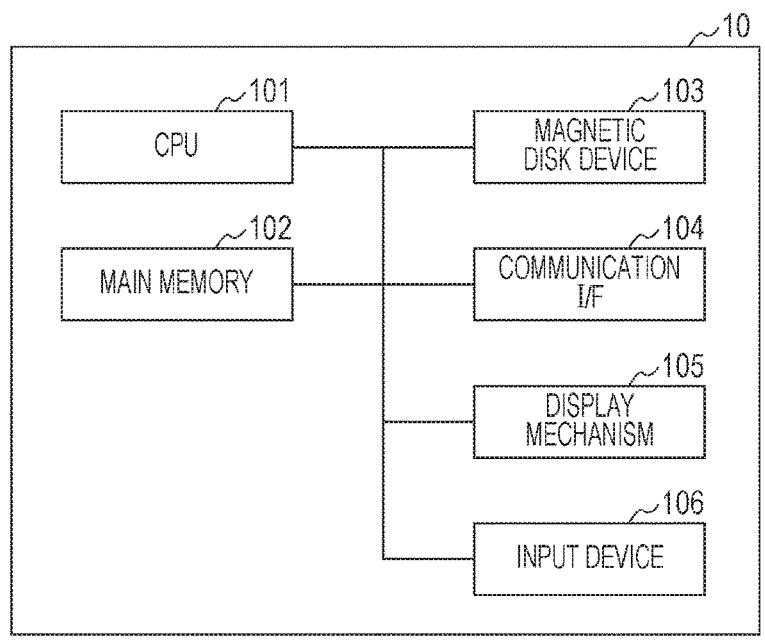
FIG. 8 illustrates an example of the hardware configuration of the color processing device.

Next, the hardware configuration of the color processing device 10 will be described. FIG. 8 illustrates an example of the hardware configuration of the color processing device 10. The color processing device 10 is implemented by a general-purpose personal computer (PC) or the like, for example. As illustrated in the drawing, the color processing device 10 includes a central processing unit (CPU) 101 that serves as a computation unit, and a main memory 102 and a magnetic disk device 103 that each serve as a storage unit.

The CPU 101 executes various types of programs such as an operating system (OS) and application software. The main memory 102 is a storage region in which the various types of programs, data for execution of such programs, etc., are stored. The magnetic disk device 103 is a storage region in which data input to the various types of programs, data output from the various types of programs, etc. are stored. The color processing device 10 further includes a communication interface 104 (hereinafter referred to as a "communication I/F") for external communication, a display mechanism 105 such as a video memory and a display, and an input device 106 such as a touch screen, a keyboard, and a mouse.

The functional sections constituting the color processing device 10 illustrated in FIGS. 2 and 5 are implemented by cooperation between software and hardware resources. Specifically, the CPU 101 loads programs for implementing the simple composite LUT generating section 11, the one-dimensional LUT inverse conversion section 12, the composite deformation LUT generating section 13, the specific-color one-dimensional LUT generating section 14, etc. from the magnetic disk device 103 into the main memory 102, for example, and executes the programs to implement the functional sections.

<Example of Hardware Configuration of Image Forming Device>

Figure 9:
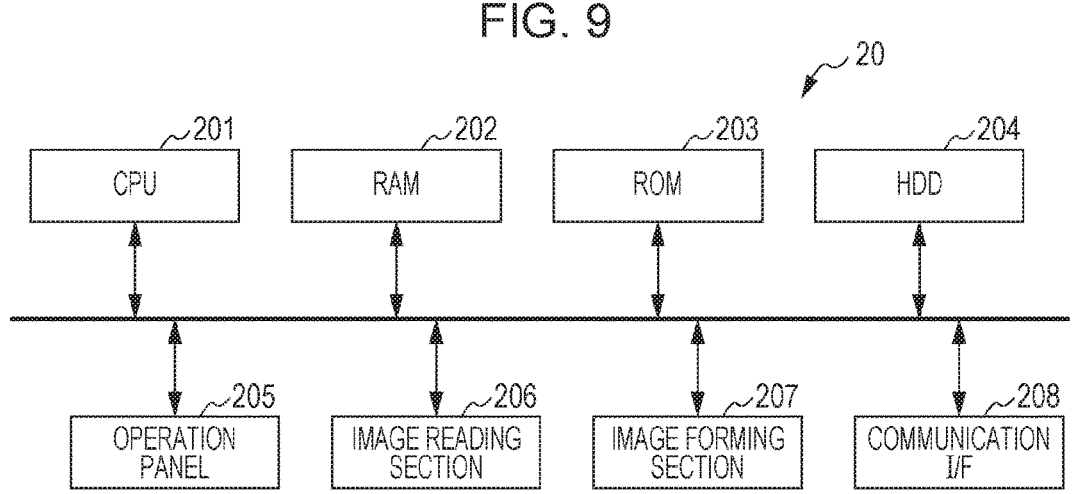
FIG. 9 illustrates an example of the hardware configuration of an image forming device.

Next, the hardware configuration of the image forming device 20 will be described. FIG. 9 illustrates an example of the hardware configuration of the image forming device 20. As illustrated in the drawing, the image forming device 20 includes a CPU 201, a random access memory (RAM) 202, a read only memory (ROM) 203, a hard disk drive (HDD) 204, an operation panel 205, an image reading section 206, an image forming section 207, and a communication I/F 208.

The CPU 201 loads various types of programs stored in the ROM 203 etc. into the RAM 202 and executes the programs to implement various functions of the image forming device 20. The RAM 202 is a memory used as a working memory for the CPU 201, for example. The ROM 203 is a memory that stores the various types of programs etc. to be executed by the CPU 201. The HDD 204 stores LUTs etc. received from the color processing device 1. The operation panel 205 is a touch screen, for example, that displays various information and that receives an operation input from the user.

The image reading section 206 reads an image recorded on a recording medium such as paper. The image reading section 206 may be a scanner, for example, and may be of a CCD type in which light radiated from a light source and reflected by an original copy is contracted using a lens to be received by charge coupled devices (CCD), or a CIS type in which light sequentially radiated from a light emitting diode (LED) light source and reflected by an original copy is received by a contact image sensor (CIS).

The image forming section 207, which serves as an example of the "image forming unit", forms an image on a recording material. The image forming section 207 performs a color conversion process using the LUTs transmitted from the color processing device 10, and forms an image on the recording material. The image forming section 207 may be of an electrophotographic system in which toner adhering to a photosensitive body is transferred onto a recording material to form an image, or an inkjet type in which ink is injected onto a recording medium to form an image. The communication I/F 208 exchanges various information with the color processing device 10 via the network 30.

The LUT compositing process performed by the color processing device 10 according to the exemplary embodiment of the present invention may be performed by the image forming device 20.

<Program>

The process performed by the color processing device 10 or the image forming device 20 according to the exemplary embodiment of the present invention is prepared as a program such as application software, for example.

Hence, in the exemplary embodiment of the present invention, the process performed by the color processing device 10 may be considered as a program causing a computer to execute color processing including: compositing a plural color conversion rules in a color space that includes plural color components through serial processing; modifying the color conversion rules after being composited, by applying an inverse conversion of a specific one-dimensional correlation, which correlates input color values and output color values in the color space, to the composited color conversion rules; and outputting the composited color conversion rules after being modified and the specific one-dimensional correlation.

The programs for implementing the exemplary embodiment of the present invention may be not only provided by a communication unit but also provided as stored in a recording medium such as a CD-ROM.

While exemplary embodiments of the present invention have been described above, the technical scope of the present invention is not limited to the exemplary embodiments described above. It is apparent from the following claims that a variety of modifications and improvements that may be made to the exemplary embodiments described above also fall within the technical scope of the present invention.

What is claimed is:

1. A color processing system comprising:
a processor configured to execute:
a compositing unit configured to composite a plurality of color conversion rules in a color space that includes a plurality of color components through serial processing;
a modification unit configured to modify the color conversion rules after being composited by the compositing unit, by applying an inverse conversion of a specific one-dimensional correlation, which correlates input color values and output color values in the color space, to the composited color conversion rules; and
an output unit configured to output the composited color conversion rules after being modified and the specific one-dimensional correlation; and
an image forming device configured to form an image on a recording material using the composited color conversion rules after being modified and the specific one-dimensional correlation output by the output unit.

2. The color processing system according to claim 1, wherein the output unit is configured to output the modified composited color conversion rules and the specific one-dimensional correlation in place of the plurality of color conversion rules.

3. The color processing system according to claim 1, wherein the plurality of color conversion rules include a plurality of multi-dimensional color conversion rules for performing a color conversion on each of the plurality of color components, and
the specific one-dimensional correlation is used in a color conversion process positioned between color conversion processes performed using the plurality of multi-dimensional color conversion rules.

4. The color processing system according to claim 3, wherein the specific one-dimensional correlation is present for each of the plurality of color components.

5. The color processing system according to claim 1, wherein the specific one-dimensional correlation is prepared by correlating input color values that indicate tones in a specific color region and output color values output when the input color values are input to the plurality of color conversion rules.

6. An image forming system comprising:
a processor configured to execute:
a compositing unit configured to composite a plurality of color conversion rules in a color space that includes a plurality of color components through serial processing; and
a modification unit configured to modify the color conversion rules after being composited by the compositing unit, by applying an inverse conversion of a specific one-dimensional correlation, which correlates input color values and output color values in the color space, to the composited color conversion rules; and
an image forming device configured to form an image on a recording material using the composited color conversion rules after being modified and the specific one-dimensional correlation.

7. A color processing method comprising:
compositing a plurality of color conversion rules in a color space that includes a plurality of color components through serial processing;
modifying the color conversion rules after being composited, by applying an inverse conversion of a specific one-dimensional correlation, which correlates input color values and output color values in the color space, to the composited color conversion rules;
outputting the composited color conversion rules after being modified and the specific one-dimensional correlation; and
forming an image on a recording material using the output composited color conversion rules after being modified and the specific one-dimensional correlation.

8. A non-transitory computer readable medium storing a program causing a computer to execute color processing comprising:
compositing a plurality of color conversion rules in a color space that includes a plurality of color components through serial processing;
modifying the color conversion rules after being composited, by applying an inverse conversion of a specific one-dimensional correlation, which correlates input color values and output color values in the color space, to the composited color conversion rules;
outputting the composited color conversion rules after being modified and the specific one-dimensional correlation; and
forming an image on a recording material using the output composited color conversion rules after being modified and the specific one-dimensional correlation.

* * * * *